(12) United States Patent
Cartwright et al.

(10) Patent No.: US 12,266,063 B2
(45) Date of Patent: Apr. 1, 2025

(54) ORIENTATION OF AUGMENTED CONTENT IN INTERACTION SYSTEMS

(71) Applicant: Snap Inc., Santa Monica, CA (US)

(72) Inventors: Luke Cartwright, Seattle, WA (US); Ilteris Kaan Canberk, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 125 days.

(21) Appl. No.: 18/187,594

(22) Filed: Mar. 21, 2023

(65) Prior Publication Data

US 2024/0320927 A1 Sep. 26, 2024

(51) Int. Cl.
| | | |
|---|---|---|
| *G06T 19/00* | (2011.01) | |
| *G02B 27/01* | (2006.01) | |
| *G06F 3/01* | (2006.01) | |
| *G06T 19/20* | (2011.01) | |

(52) U.S. Cl.
CPC ........ *G06T 19/006* (2013.01); *G02B 27/0172* (2013.01); *G06F 3/012* (2013.01); *G06T 19/20* (2013.01); *G02B 2027/0178* (2013.01); *G06T 2219/2016* (2013.01)

(58) Field of Classification Search
CPC ........ G06F 3/012; G06T 19/006; G06T 19/20
See application file for complete search history.

(56) References Cited

U.S. PATENT DOCUMENTS

| | | | | |
|---|---|---|---|---|
| 2017/0099481 | A1* | 4/2017 | Held | H04N 13/383 |
| 2019/0310479 | A1* | 10/2019 | Bak | G06T 19/006 |
| 2020/0202629 | A1* | 6/2020 | Sharma | G02B 27/0172 |
| 2020/0320794 | A1 | 10/2020 | Huang et al. | |

FOREIGN PATENT DOCUMENTS

WO 2019079826 4/2019

OTHER PUBLICATIONS

"International Application Serial No. PCT/US2024/017333, International Search Report mailed Jun. 4, 2024", 3 pgs.
"International Application Serial No. PCT/US2024/017333, Written Opinion mailed Jun. 4, 2024", 6 pgs.

* cited by examiner

*Primary Examiner* — Charles Tseng
(74) *Attorney, Agent, or Firm* — Schwegman Lundberg & Woessner, P.A.

(57) ABSTRACT

A head-wearable apparatus determines an imaginary reference plane intersecting a head of a user viewing augmented content in a viewing pane having vertical and lateral dimensions in a display of the head-wearable apparatus. The imaginary reference plane coincides with a first viewing direction of the head of the user. The apparatus detects a rotational movement of the head of the user in a vertical direction while viewing the augmented content. In response to the detected rotational movement, the apparatus determines a second viewing direction of the head of the user when viewing the augmented content in the second viewing direction and determines a reference angle between the imaginary reference plane and the second viewing direction. Based on the reference angle, the apparatus assign one of a billboard display mode and a headlock display mode (or combination) to the augmented content presented in the display.

33 Claims, 12 Drawing Sheets

ORIENTATION OF AUGMENTED CONTENT IN INTERACTION SYSTEMS

BACKGROUND

The present disclosure relates generally to wearable devices, including a head-wearable apparatus for viewing augmented content displayed in a content interaction system. The present disclosure also relates to orienting content in an augmented reality (AR) display such as in a heads-up-display or head-wearable apparatus.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
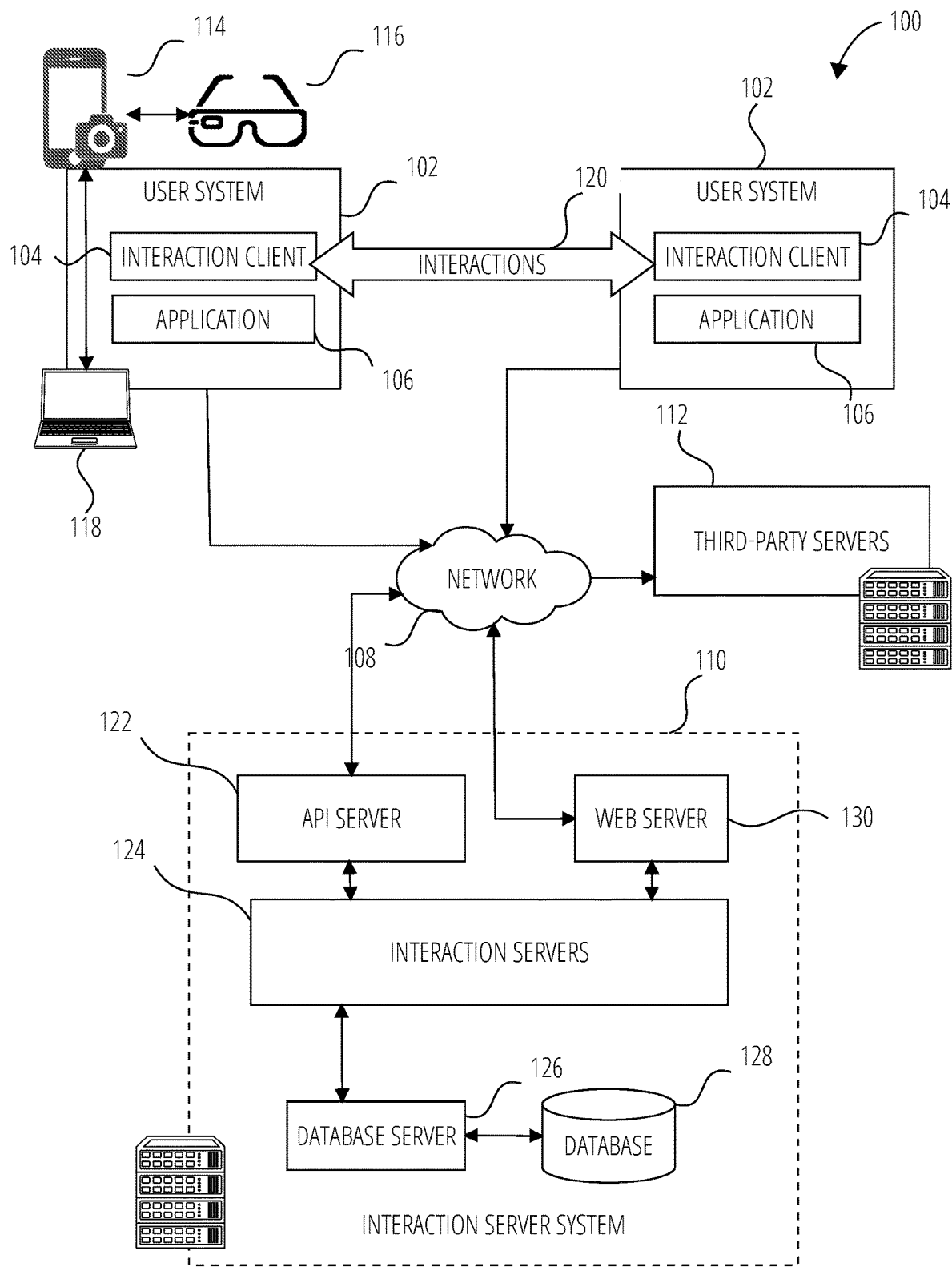
FIG. 1 is a diagrammatic representation of a networked environment in which the present disclosure may be deployed, according to some examples.

Users with a range of interests from various locations can capture digital images of various subjects and make captured images available to others via networks, such as the Internet. To enhance users' experiences with digital images and provide various features, it can be challenging and computationally intensive to enable computing devices to perform image processing operations on various objects and/or features captured in a wide range of changing conditions (e.g., changes in image scales, noises, lighting, movement, or geometric distortion).

AR technology aims to bridge a gap between virtual environments and a real-world environment by providing an enhanced real-world environment that is augmented with electronic information. As a result, the electronic information appears to be part of the real-world environment as perceived by a user. In an example, AR technology further provides a user interface to interact with the electronic information that is overlaid in the enhanced real-world environment.

As mentioned above, the present disclosure also relates to orienting content in an AR display such as in a heads-up-display or head-wearable apparatus. A piece of content oriented in front of and towards a user in an AR display this may be referred to as head-locked content. Content positioned in this way this may, however, feel like is it attached to the display screen and not the real world, thereby detracting from a sense of realism or a lifelike user experience.

A common solution to try to add realism is to rotate the content laterally about the user so that it continuously faces the user's head as the user's head rotates. However, content aligned in this way may become less and less visible as the user looks up or down. In extreme cases, the content in an augmented display screen may diminish or collapse into a single edge if the user lifts or drops his or her head significantly when seeking to view AR content.

An AR system enables real and virtual environments to be combined in varying degrees to facilitate interactions from a user in a real-time manner. Such an AR system, as described herein, therefore can include various possible combinations of real and virtual environments, including AR that primarily includes real elements and is closer to a real environment than a virtual environment (e.g., without real elements). In this manner, a real environment can be connected with a virtual environment by the AR system. A user immersed in an AR environment can navigate through such an environment, and the AR system can track the user's viewpoint to provide a visualization based on how the user is situated in the environment. AR experiences can be provided in an interaction system as described in embodiments herein.

Embodiments of the subject technology described herein enable various operations involving AR content for capturing, mirroring, modifying, and navigating such content with a given electronic device, such as a mobile computing device, or a head-wearable apparatus, such as spectacles. Some embodiments herein relate generally to wearable devices, including a head-wearable device which includes a waveguide-based display. The present disclosure also relates to mirroring AR content in a wearable device and to mirroring and navigating AR content in interaction systems.

Interaction systems, such as messaging systems, are frequently utilized and are increasingly leveraged by users of mobile computing devices, in various settings, to provide different types of functionality in a convenient manner. As described herein, the interaction system comprises practical applications that provide improvements in capturing and mirroring image data and rendering AR content (e.g., images, videos, and the like) based on the captured image data by at least providing technical improvements with capturing image data using power- and resource-constrained electronic devices. Such improvements in capturing and mirroring image data are enabled by techniques provided by the subject technology, which reduce latency and increase efficiency in processing captured image data thereby also reducing power consumption in the capturing devices.

As discussed further herein, the subject infrastructure supports the creation and sharing of interactive media, referred to herein as messages, including three-dimensional (3D) content or AR effects, throughout various components of an interactive system. In example embodiments described herein, messages can enter the system from a live camera or via storage (e.g., where messages including 3D content and/or AR effects are stored in memory or a database). The subject system supports motion sensor input, and loading of external effects and asset data.

As referred to herein, the phrase "AR experience," "AR content item," "AR content generator" includes or refers to various image processing operations corresponding to an image modification, filter, AR content generator, media overlay, transformation, and the like, and additionally can include playback of audio or music content during presentation of AR content or media content, as described further herein.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks, including a network 108 (e.g., the Internet), to other instances of the interaction client 104 (e.g., hosted on respective other user systems 102), an interaction server system 110, and third-party servers 112. An interaction client 104 can also communicate with locally hosted applications 106 using Applications Program Interfaces (APIs).

Each user system 102 may include multiple user devices, such as a mobile device 114, head-wearable apparatus 116, and a computer client device 118, that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the client systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

Figure 2:
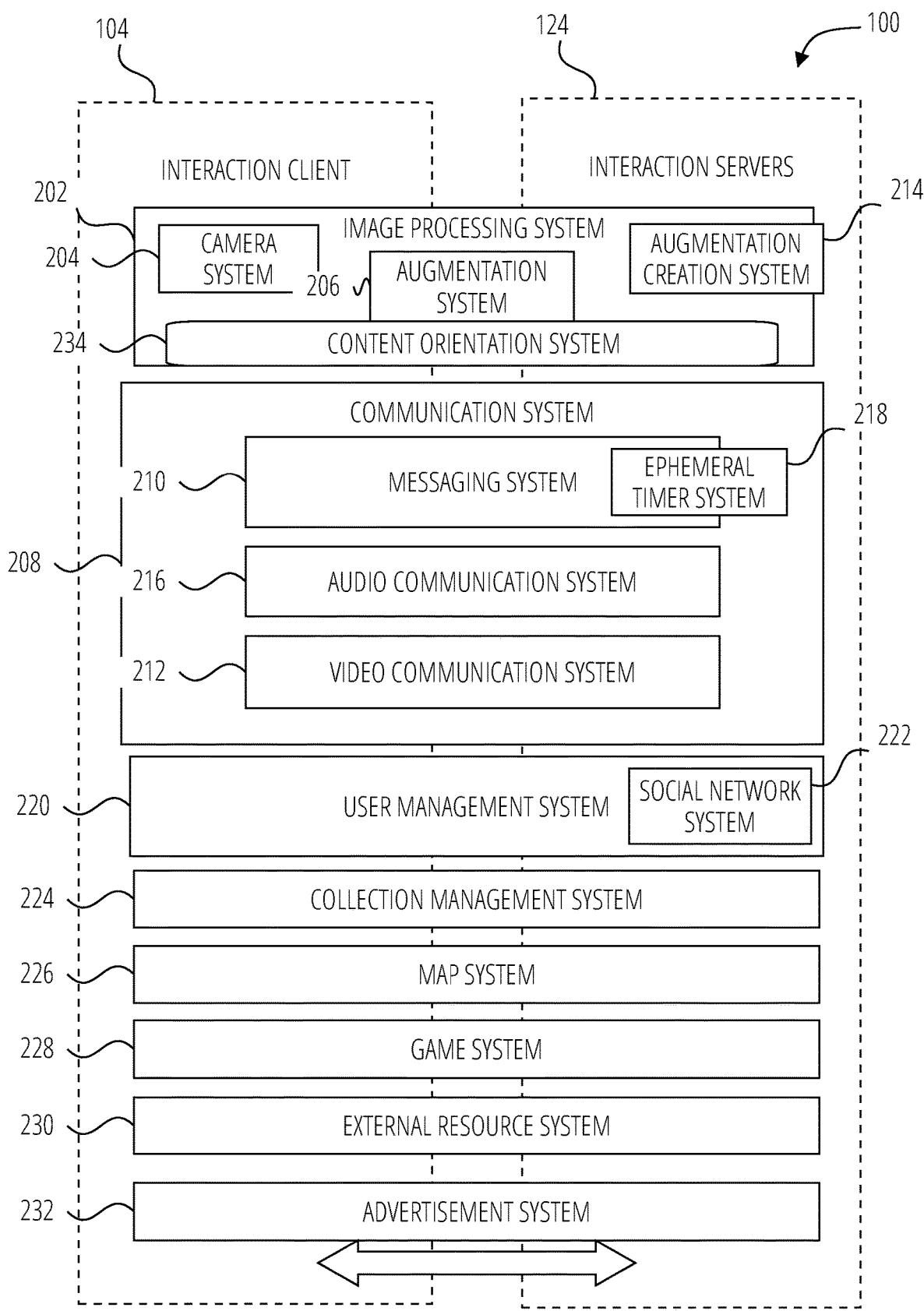
FIG. 2 is a diagrammatic representation of an interaction system, according to some examples, that has both client-side and server-side functionality.

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language documents corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).
System Architecture FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:
    Geolocation of the user system 102; and
    Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of a communication system 208, such as a messaging system 210 and a video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

An augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A content orientation system 234 is operationally responsible (in conjunction with the image processing system 202, in some examples) for orienting content viewed in an augmented content display, such as in a head-wearable apparatus 116 described further below. The content orientation system 234 may be located in the interaction system 100, on a mobile device 114, in the head-wearable apparatus 116, or a combination of these locations. The content orientation system 234 operates to provide the hybrid display modes discussed herein, including, for example, the billboard display mode and the headlock display mode.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides a bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a GUI (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another GUI of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional (2D) avatars of users with or without different avatar characteristics). As another example, external resources that include small-scale versions of applications (e.g., web-based versions of applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
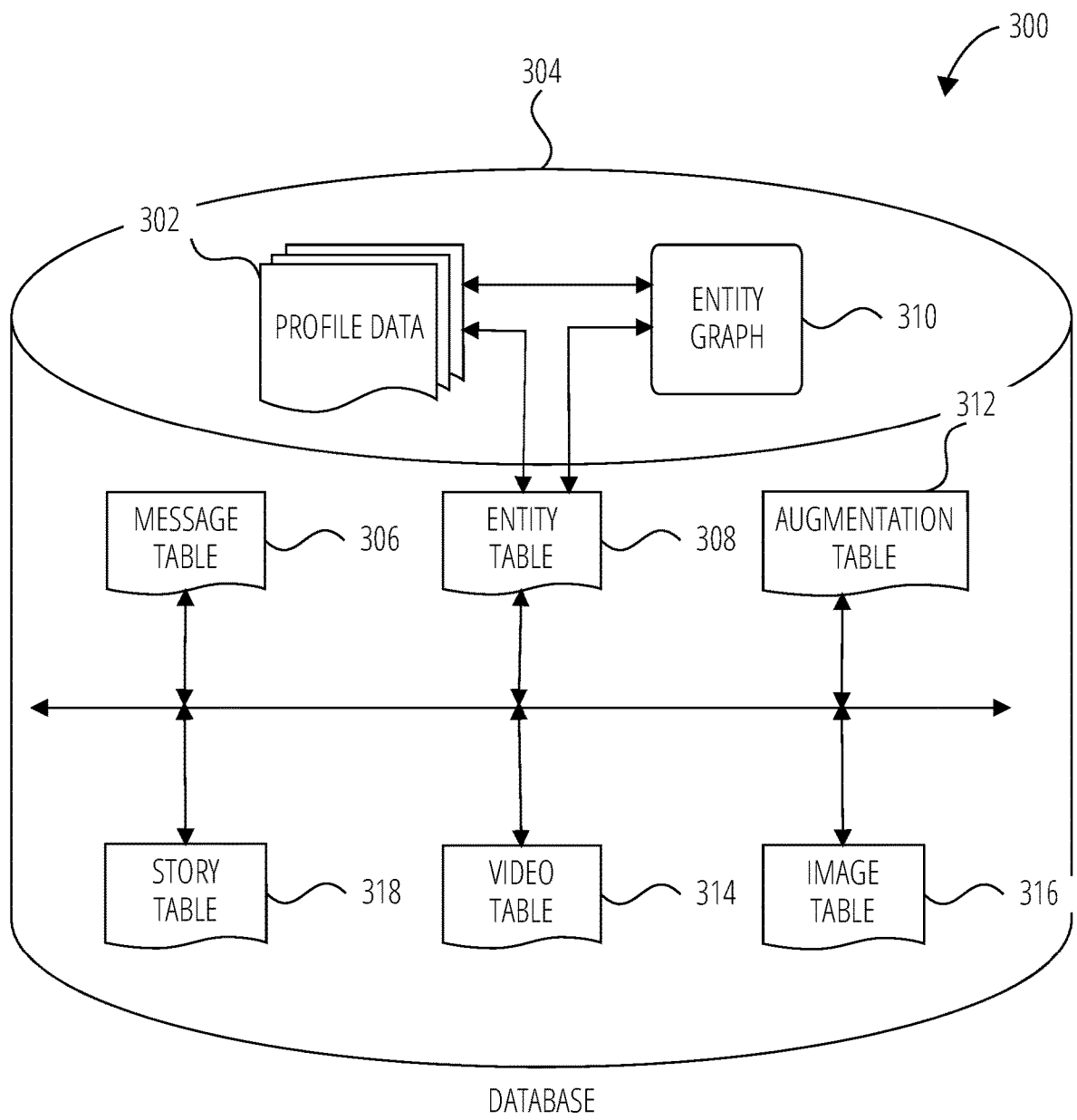
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), and a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes AR content items (e.g., corresponding to applying "lenses" or AR experiences). An AR content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include [***]

Data Communications Architecture

Figure 4:
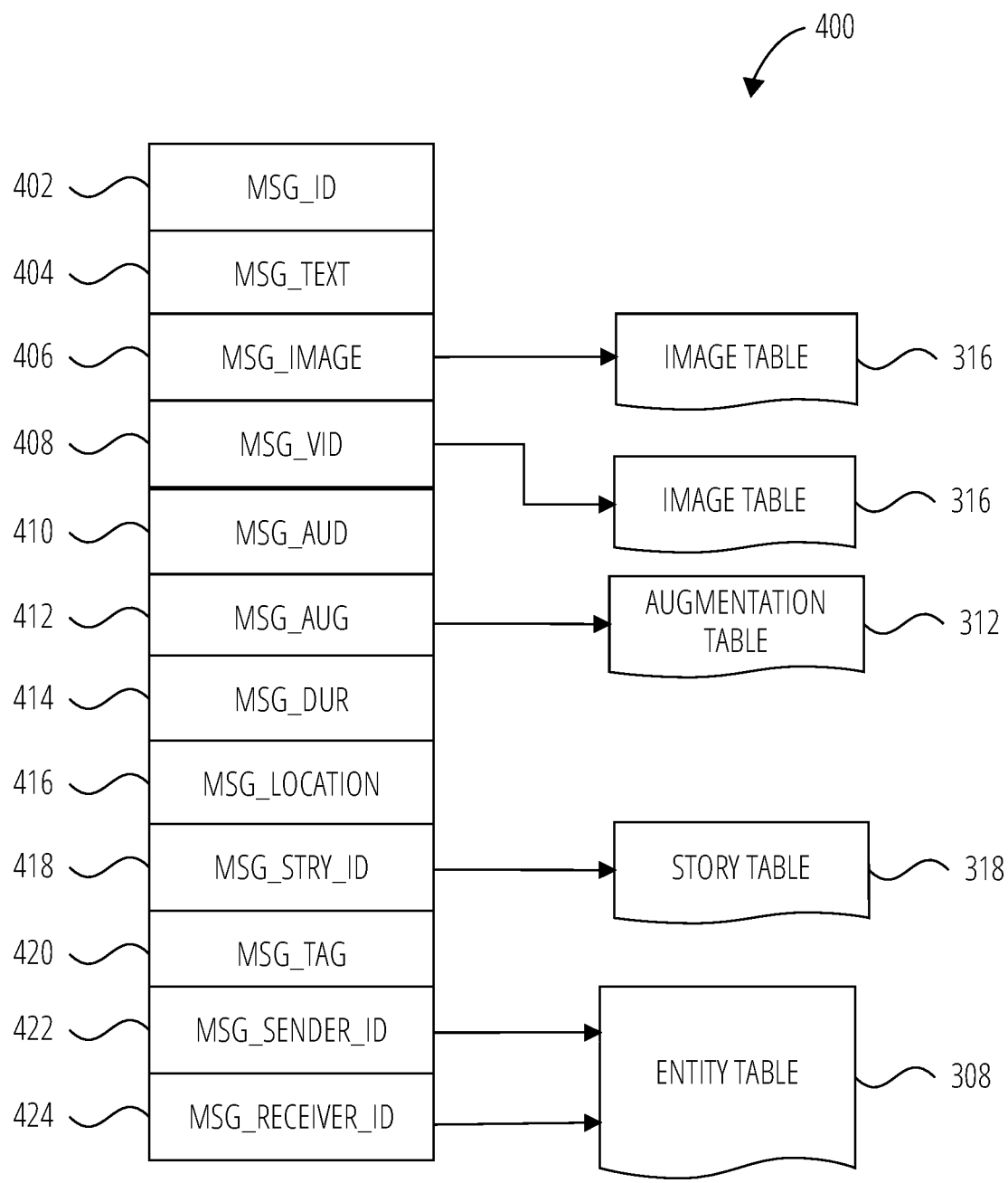
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

System with Head-Wearable Apparatus

Figure 5:
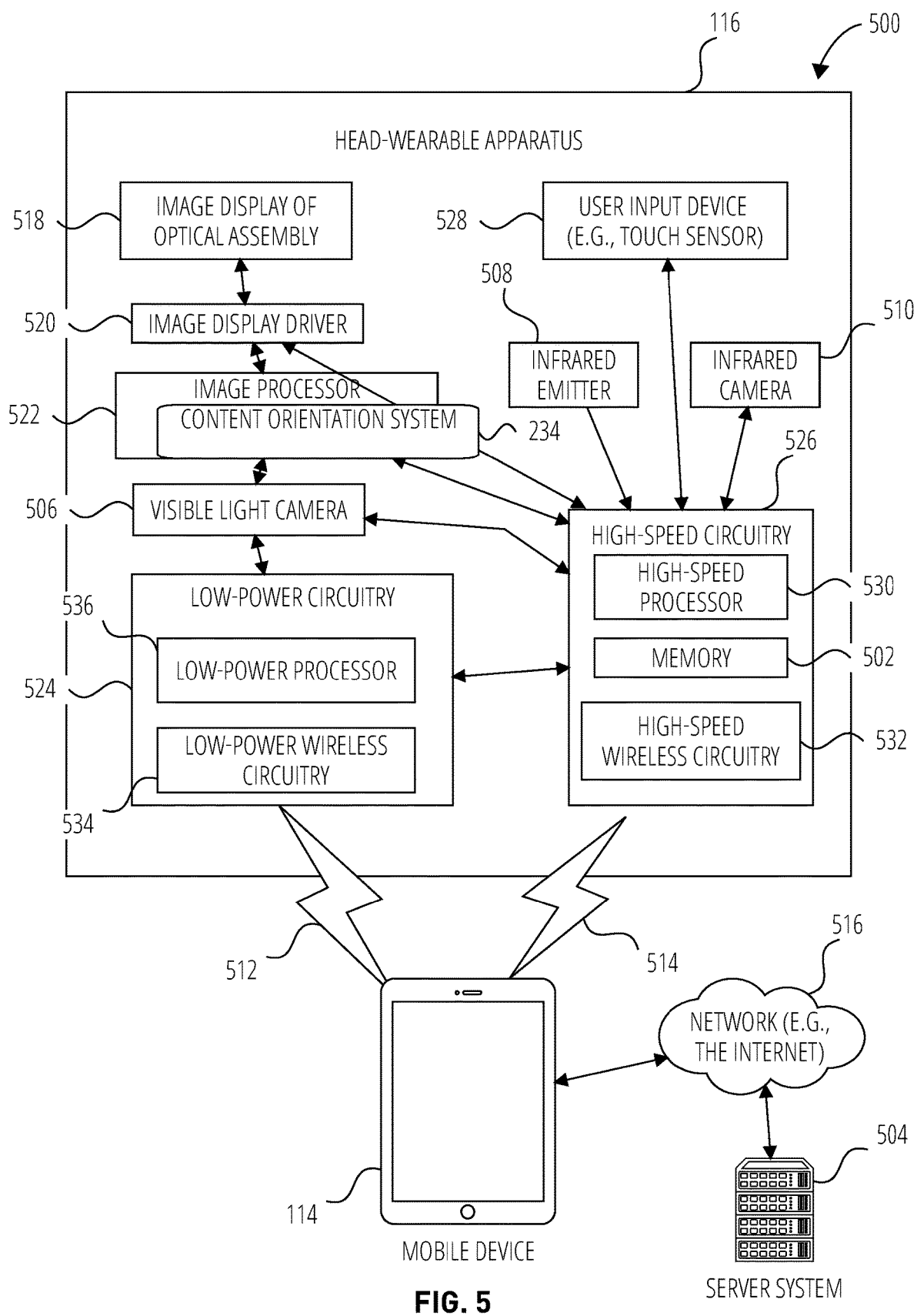
FIG. 5 illustrates components of a head-wearable apparatus, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the interaction server system 110) via various networks 516.

The head-wearable apparatus 116 includes one or more cameras, each of which may be, for example, a visible light camera 506, an infrared emitter 508, and an infrared camera 510.

The mobile device 114 connects with head-wearable apparatus 116 using both a low-power wireless connection 512 and a high-speed wireless connection 514. The mobile device 114 is also connected to the server system 504 and the network 516.

The head-wearable apparatus 116 further includes two image displays 518 of an optical assembly. The two image displays 518 of the optical assembly include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display 518 is for presenting images and videos, including an image that can include a graphical user interface to a user of the head-wearable apparatus 116.

The image processor 522 includes a content orientation system 234. The content orientation system 234 is operationally responsible for orienting content viewed in an augmented content display, such as in an image display 518 of the head-wearable apparatus 116. The content orientation system 234 operates to provide the hybrid display modes discussed herein, including, for example, the billboard display mode and the headlock display mode.

The image display driver 520 commands and controls the image display 518. The image display driver 520 may deliver image data directly to the image display 518 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the GUI of the presented image.

The components shown in FIG. 5 for the head-wearable apparatus 116 are located on one or more circuit boards, for example a printed circuit board (PCB) or flexible PCB, in the rims or temples. Alternatively, or additionally, the depicted components can be located in the cheeks, temple pieces, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include a storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 524 and the high-speed wireless circuitry 532 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or a low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the mobile device 114 via the high-speed wireless connection 514 or connected to the server system 504 via the network 516. When paired, the head-wearable apparatus 116 may receive mirrored or other content from mobile device 114 or the server system 504. Received content may be displayed in the two image displays 518 of the optical assembly. The server system 504 may be one or more computing devices as part of a service or network computing system, for example, that includes a processor, a memory, and network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via low-power wireless circuitry 534 or high-speed wireless circuitry 532.

Figure 6:
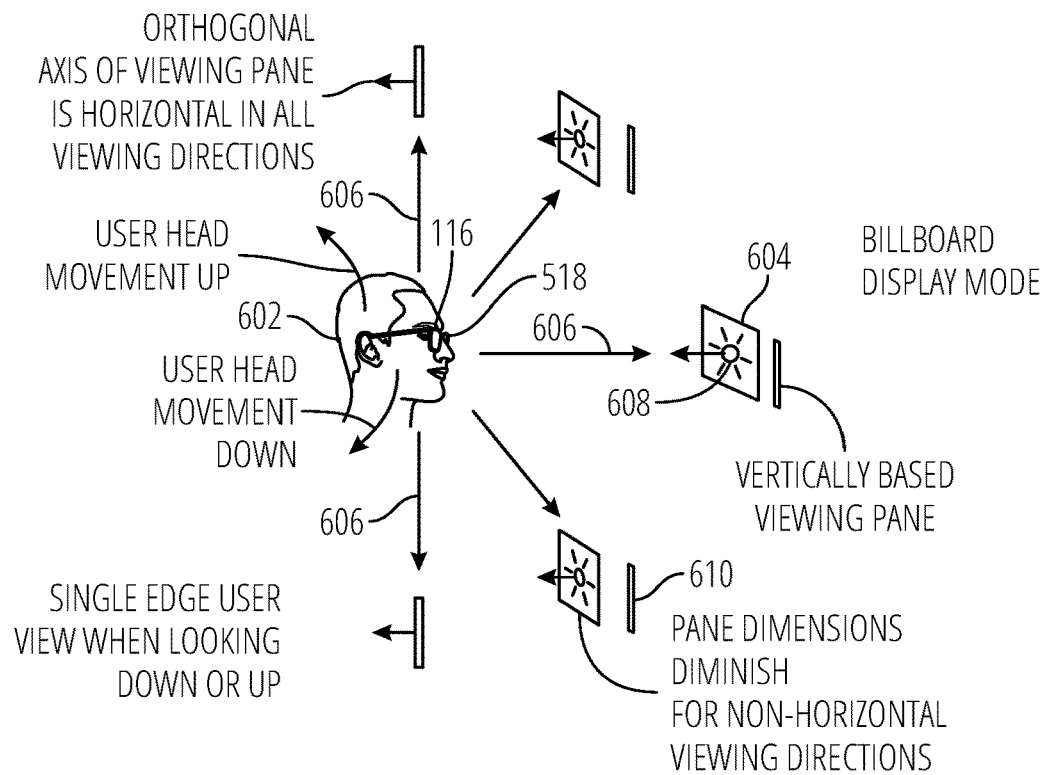
FIG. 6 illustrates aspects of a billboard display mode, according to some examples.

Reference is now made to FIG. 6. FIG. 6 illustrates aspects of a billboard display mode, according to some examples. A head 602 is shown wearing a head-wearable apparatus 116 to view augmented content therein. The user can view content in a number of viewing directions 606. The viewing directions 606 may include a range of viewing directions 606 including, for example, a horizontal viewing direction 606, a vertically up viewing direction 606, a vertically down viewing direction 606, and a range of viewing directions 606 between these two extremes. Example viewing directions 606 are shown in FIG. 6.

Figure 8A:
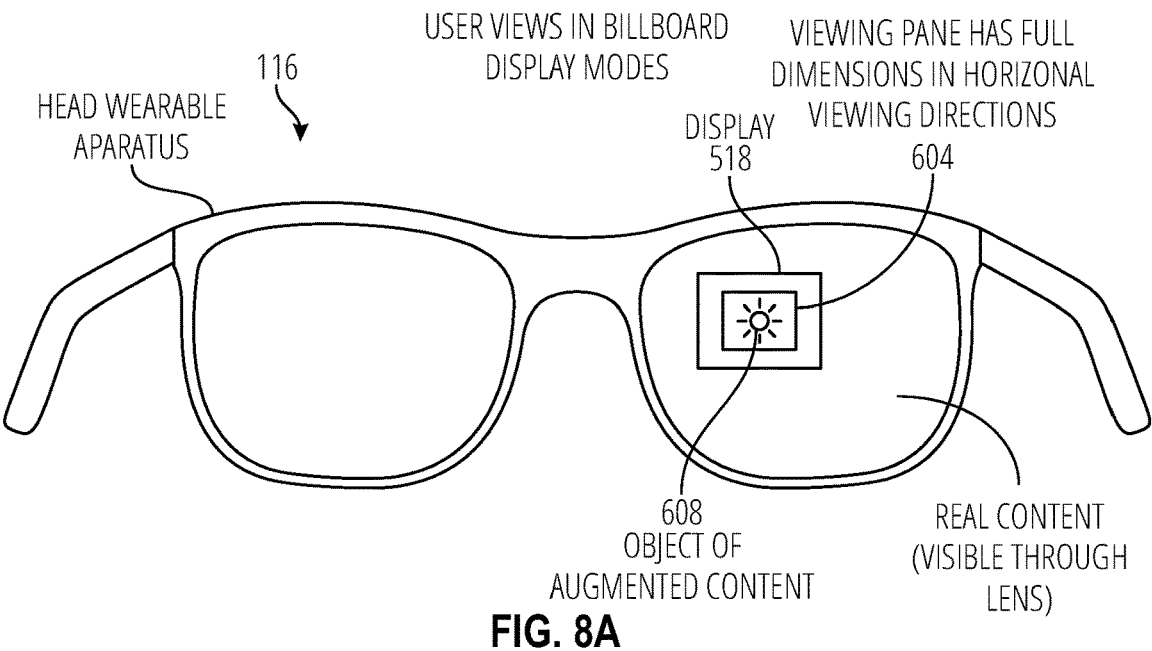
FIG. 8A illustrates an example view in a billboard display mode.

In some examples, the augmented content is displayed in an image display 518 of the head-wearable apparatus 116. The augmented content is visible in a viewing pane 604 presented by the image display 518. The augmented content includes a virtual object 608. In the illustrated billboard display mode, the viewing pane 604 is continuously aligned or oriented with a vertical axis 610, as shown. This mode can work well to present augmented content in the image display 518 when the user looks in a horizontal (or substantially horizontal) direction, for example. An example view in this viewing direction 606 is provided in FIG. 8A. The virtual object 608, in this case a sun emanating rays of sunshine, can be viewed as a circular object in a viewing pane 604 having full (or original) lateral and vertical dimensions.

However, when the billboard display mode is used continuously to present augmented content in a head-wearable apparatus 116 in elevated or lowered viewing directions 606, this display mode can suffer the drawback that as the user (wearing the head-wearable apparatus 116) looks up and down in such non-horizontal viewing directions 606 (for example 45 degrees to the horizontal), the augmented content can tend to diminish, or even disappear in extreme cases when the user looks directly up, or directly down (for example 90 degrees to the horizontal, up or down). Example views in this regard are shown in FIG. 8B and FIG. 8C.

Figure 8B:
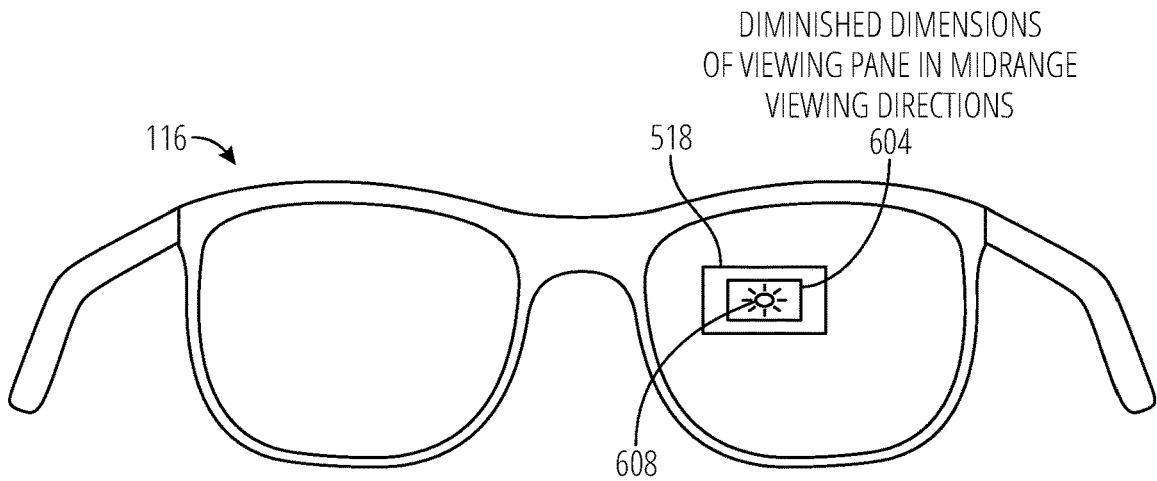
FIG. 8B illustrates another example view in a billboard display mode.
Figure 8C:
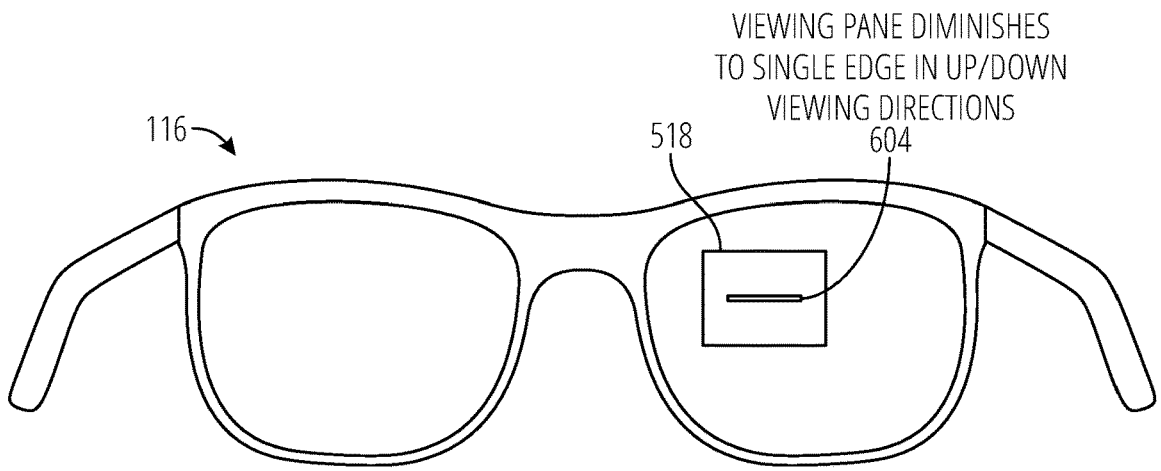
FIG. 8C illustrates another example view in a billboard display mode.

In FIG. 8B, for example when the viewing direction 606 is at 45 degrees to the horizontal, the dimensions of the viewing pane 604 are reduced. Here, at least the vertical dimension of the viewing pane 604 is diminished, i.e., reduced in size, as shown. This reduction in dimensions of the viewing pane 604 negatively affects the content of the augmented content presented therein in elevated or lowered viewing directions 606. For example, the virtual object 608 (the sun) presented in the viewing pane 604 can now only be viewed as a non-realistic oval or oblate object. In FIG. 8C, for example, when the viewing direction 606 is at 90 degrees to the horizontal, only an edge view of the viewing pane 604 can be seen. The virtual object 608 (the sun) is removed from view and cannot be seen at all. It will be appreciated that this phenomenon can significantly detract from the user's experience and/or perception of the reality of the augmented visual content.

Figure 7:
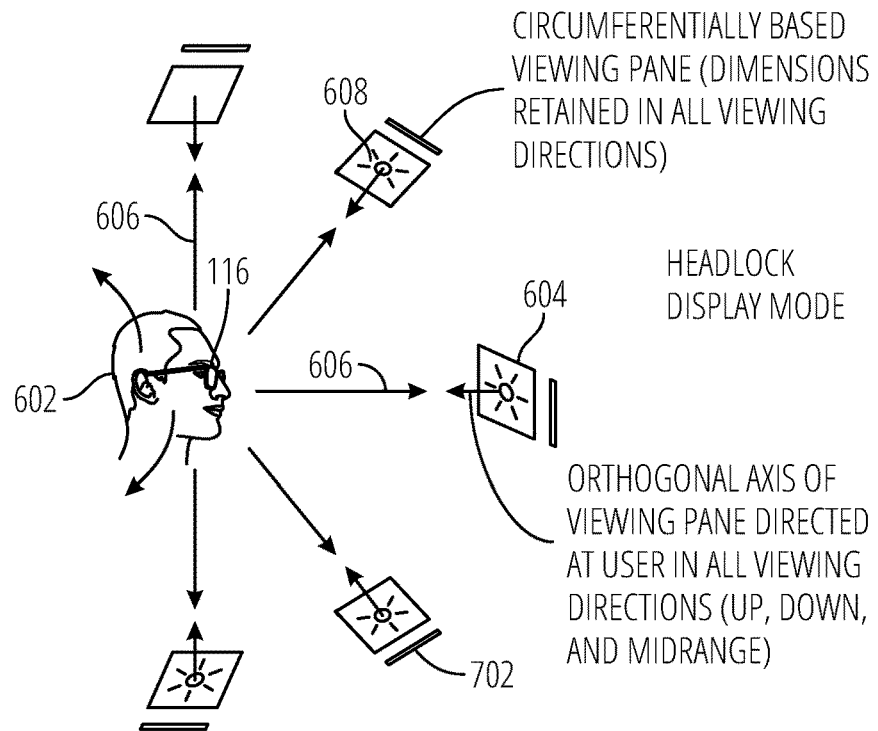
FIG. 7 illustrates aspects of a headlock display mode, according to some examples.

Reference is now made to FIG. 7. FIG. 7 illustrates aspects of a headlock display mode, according to some examples. A head 602 is again shown bearing a head-wearable apparatus 116 to view augmented content therein. The user can view content in a number of viewing directions 606. As before, the viewing directions 606 may include a range of viewing directions 606 including, for example, a horizontal viewing direction 606, a vertically up viewing direction 606, a vertically down viewing direction 606, and a range of viewing directions 606 between these two extremes. Example viewing directions 606 are shown in FIG. 7.

Figure 9:
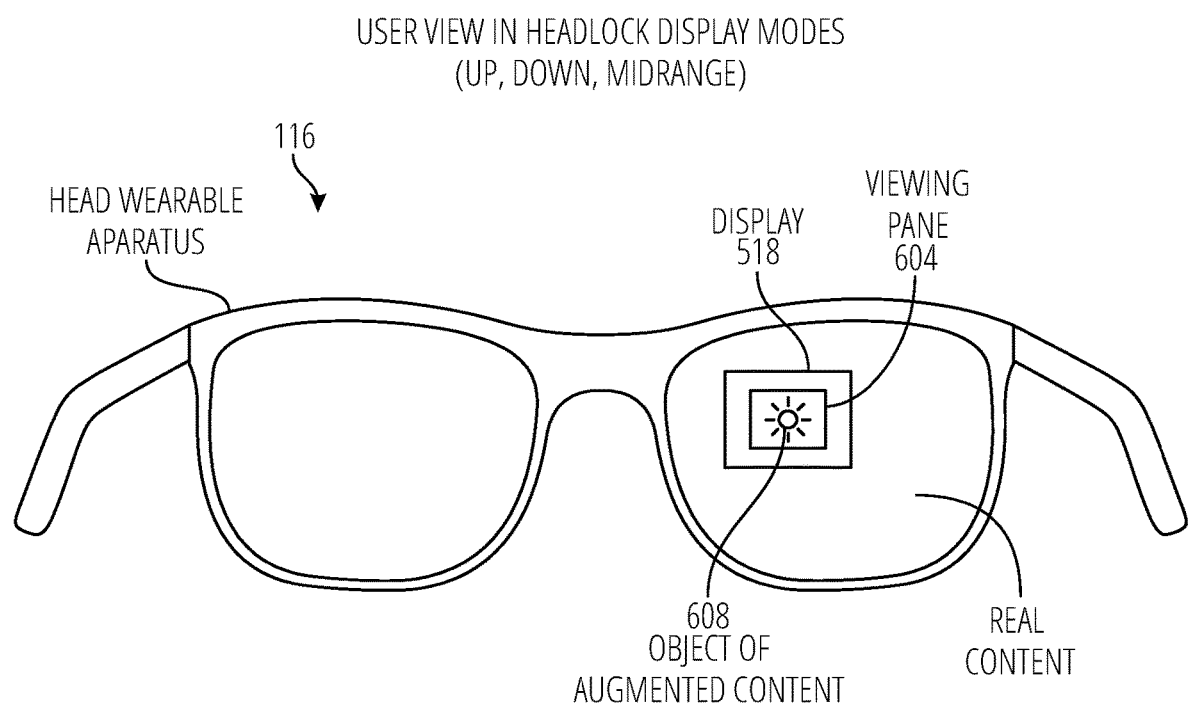
FIG. 9 illustrates an example view in a headlock display mode.

In some examples, the augmented content is displayed in an image display 518 of the head-wearable apparatus 116. The augmented content is visible in a viewing pane 604 presented by the image display 518. The augmented content includes a virtual object 608. In the illustrated headlock display mode, however, the viewing pane 604 is continuously circumferentially aligned about the user, or oriented with a circumferentially aligned axis 702, as shown. This headlock display mode can work well to continuously orient augmented content towards the user in any of the viewing directions 606. An example view in a given viewing direction 606 is provided in FIG. 9. The virtual object 608, in this case a sun emanating rays of sunshine, can be viewed as circular object in a viewing pane 604 having full (or original) lateral and vertical dimensions that are maintained in any of the viewing directions 606. But when the billboard display mode is used continuously in all viewing directions 606 to present augmented content in a head-wearable apparatus 116, the visual effect can be very non-realistic, unaesthetic, or even unpleasant to the user in extreme cases. The effect has been likened to wearing a TV on one's head, in some cases.

Figure 10:
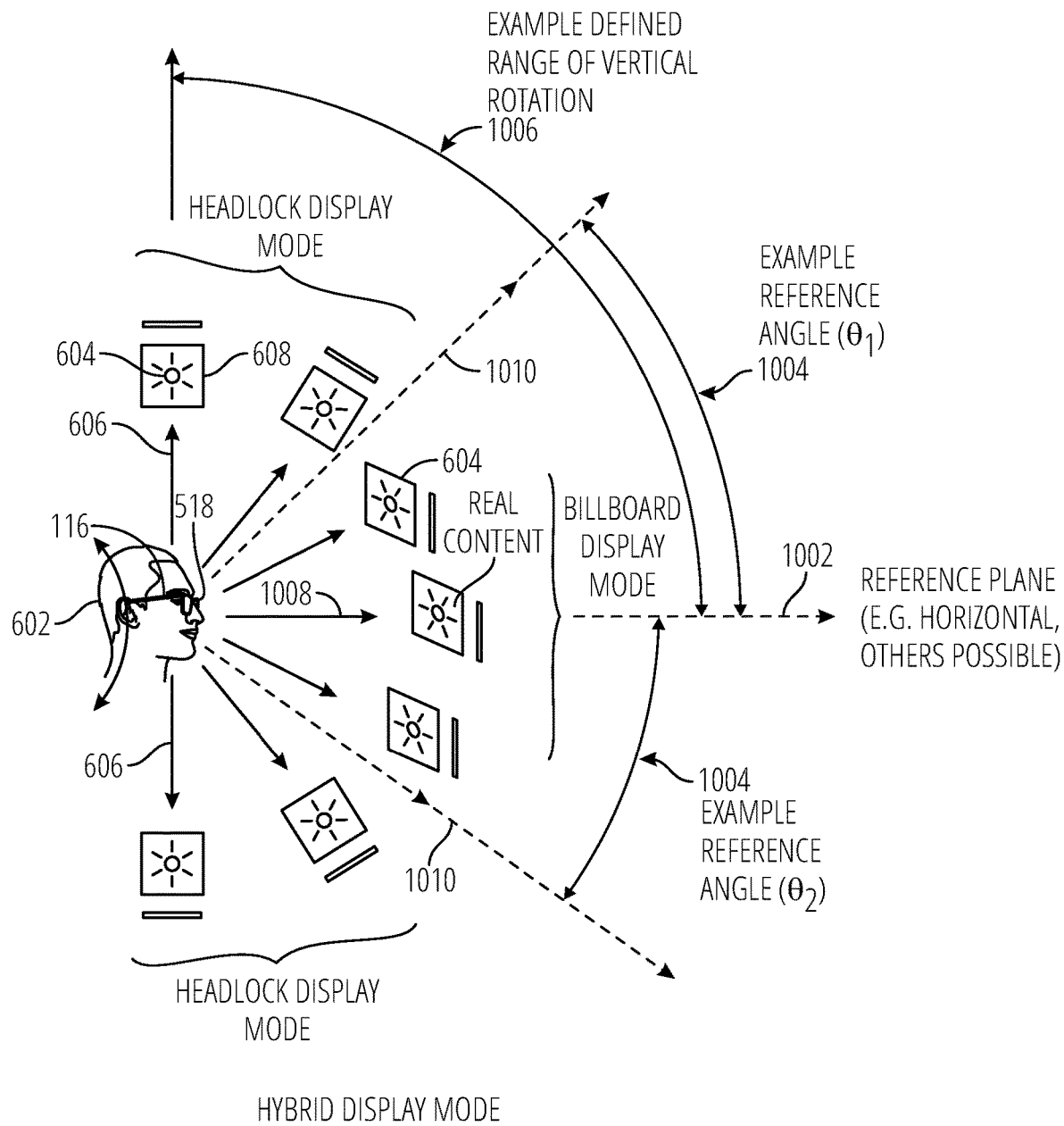
FIG. 10 illustrates aspects of a hybrid display mode, according to some examples.

With reference to FIG. 10, examples of the present disclosure seek to address the abovementioned drawbacks of continuously using only one display mode to present augmented content in a head-wearable apparatus 116 and seek to provide a hybrid display mode comprising two or more display modes within a range of viewing directions 606. In some examples, the hybrid display mode includes a blend or a determined allocation of a billboard display mode and a head-lock display mode, based on a detected viewing direction 606 within the range.

In FIG. 10, the head 602 of a user can again be seen bearing a head-wearable apparatus 116. The head-wearable apparatus 116 includes an image display 518 in which augmented content, including a virtual object 608, is displayed. The head 602 of the user rotates laterally and, in the illustrated view, vertically to view content in a number of viewing directions 606. As before, the viewing directions 606 may include a range of viewing directions 606 including, for example, a horizontal viewing direction 606, a vertically up viewing direction 606, a vertically down viewing direction 606, and a range of viewing directions 606 between these two extremes. In some examples, a detectable range of viewing directions 606 is determined. In some examples, a range of detectable vertical rotations 1006 of the head 602 of the user is determined. The augmented content is visible in a viewing pane 604 presented by the image display 518. The augmented content includes a virtual object 608.

Figure 11:
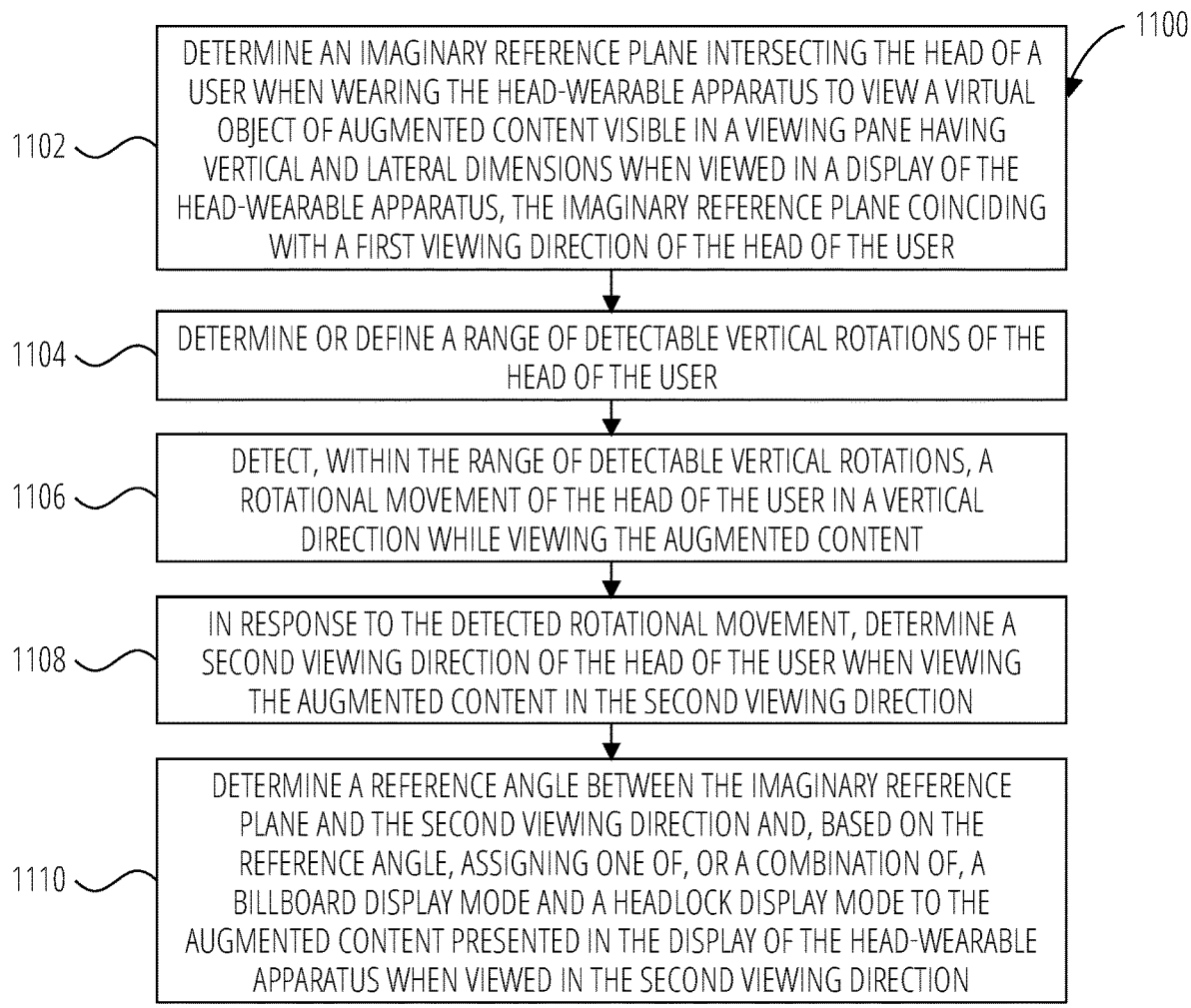
FIG. 11 illustrates a method 1100 of orienting content in an AR display, in accordance with one embodiment.

With reference to FIG. 10 and FIG. 11, in operation 1102, method 1100 of orienting content in an AR display determines an imaginary reference plane 1002 intersecting the head 602 of a user when wearing the head-wearable apparatus 116 to view a virtual object 608 of augmented content visible in a viewing pane 604 having vertical and lateral dimensions when viewed in an image display 518 of the head-wearable apparatus 116, with the imaginary reference plane 1002 coinciding with a first viewing direction 1008 of the head 602 of the user. In operation 1104, method 1100 of orienting content in an AR display determines or defines a range of detectable vertical rotations 1006 of the head 602 of the user.

In operation 1106, method 1100 of orienting content in an AR display detects, within the range of detectable vertical rotations 1006, a rotational movement of the head 602 of the user in a vertical direction while viewing the augmented content. In operation 1108, method 1100 of orienting content in an AR display determines, in response to the detected rotational movement, a second viewing direction 1010 of the head 602 of the user when viewing the augmented content in the second viewing direction 1010.

In operation 1110, method 1100 of orienting content in an AR display determines a reference angle 1004 between the imaginary reference plane 1002 and the second viewing direction 1010 and, based on the reference angle 1004, assigns one of, or a combination of, a billboard display mode and a headlock display mode to the augmented content presented in the image display 518 of the head-wearable apparatus 116 when viewed in the second viewing direction 1010.

The method may also include where the imaginary reference plane is horizontal and coincides with a horizontal dimension of the viewing pane. Other reference planes, such as vertical or midrange reference planes, are possible.

The method may also include where the detected rotational movement of the head of the user is detected using the head-wearable apparatus.

The method may also include where the assigning of one of, or a combination of, a billboard display mode and a headlock display mode to the augmented content is further based on a determined ratio of the billboard display mode relative to the headlock display mode within in the range of detectable vertical rotations of the head of the user.

The method may also include where the determined ratio is directly proportional to the reference angle.

The method may also include where the determined ratio is algorithmically determined based on the reference angle.

The method may also include where the algorithmic determination includes determining a first rotational angle of elevation or declination of an axis normal to the viewing pane with respect to the head of the user, and determining a second rotational angle of elevation or declination of an axis normal to the viewing pane to render the viewing pane substantially orthogonal to the second viewing direction.

The method may also include where the algorithmic determination further includes combining the first rotational angle and the second rotational angle into a virtual object orientation-adjustment value, and applying the virtual object orientation-adjustment value to the virtual object while displaying the augmented content in the second viewing direction.

The method may also include where applying the virtual object orientation-adjustment value to the virtual object further includes maintaining the vertical and lateral dimensions of the viewing pane while displaying the augmented content in the second viewing direction.

The method may further include continuously monitoring movements of the head of the user within the range of detectable vertical rotations and dynamically recalculating the virtual object orientation-adjustment value based on the continuously monitored movements of the head of the user.

The method may further include continuously maintaining the vertical and lateral dimensions of the viewing pane while displaying the augmented content in further viewing directions. Other technical features may be readily apparent to one skilled in the art from the following figures, descriptions, and claims. The method may be embodied in computer-readable instructions for execution by one or more computer processors such that the operations of the method may be performed in part or in whole by the content orientation system 234, or the image processing system 202, or the image processor 522 executing on the head-wearable apparatus 116. Accordingly, the method 1100 of orienting content in an AR display is described herein by way of example with reference thereto. However, it shall be appreciated that at least some of the operations of the method 1100 of orienting content in an AR display may be deployed on various other hardware configurations and the method is not intended to be limited to the components or systems mentioned above. The operations described in FIG. 11, in an embodiment, correspond to at least the description of operations as discussed above.

EXAMPLES

Some examples are provided in this disclosure.

Example 1 includes a head-wearable apparatus comprising: a processor; and a memory storing instructions that, when executed by the processor, configure the head-wearable apparatus to: determine an imaginary reference plane intersecting a head of a user when wearing the head-wearable apparatus to view a virtual object of augmented content visible in a viewing pane having vertical and lateral dimensions when viewed in a display of the head-wearable apparatus, the imaginary reference plane coinciding with a first viewing direction of the head of the user; determine or define a range of detectable vertical rotations of the head of the user; detect, within the range of detectable vertical rotations, a rotational movement of the head of the user in a vertical direction while viewing the augmented content; in response to the detected rotational movement, determine a second viewing direction of the head of the user when viewing the augmented content in the second viewing direction; and determine a reference angle between the imaginary reference plane and the second viewing direction and, based on the reference angle, assign one of, or a combination of, a billboard display mode and a headlock display mode to the augmented content presented in the display of the head-wearable apparatus when viewed in the second viewing direction.

Example 2 includes the elements of Example 1, wherein the imaginary reference plane is horizontal and coincides with a horizontal dimension of the viewing pane.

Example 3 includes the elements of Examiner 2 or Example 3, wherein the detected rotational movement of the head of the user is detected using the head-wearable apparatus.

Example 4 includes the elements of any one of Examples 1-3, wherein the assigning of one of, or a combination of, a billboard display mode and a headlock display mode to the augmented content is further based on a determined ratio of the billboard display mode relative to the headlock display mode within the range of detectable vertical rotations of the head of the user.

Example 5 includes the elements of any one of Examples 1-4, wherein the determined ratio is directly proportional to the reference angle.

Example 6 includes the elements of any one of Examples 1-5, wherein the determined ratio is algorithmically determined based on the reference angle.

Example 7 includes the elements of any one of Examples 1-6, wherein the algorithmic determination includes: determining a first rotational angle of elevation or declination of an axis normal to the viewing pane with respect to the head of the user; and determining a second rotational angle of elevation or declination of an axis normal to the viewing pane to render the viewing pane substantially orthogonal to the second viewing direction.

Example 8 includes the elements of any one of Examples 1-7, wherein the algorithmic determination further includes: combining the first rotational angle and the second rotational angle into a virtual object orientation-adjustment value; and applying the virtual object orientation-adjustment value to the virtual object while displaying the augmented content in the second viewing direction.

Example 9 includes the elements of any one of Examples 1-8, wherein applying the virtual object orientation-adjustment value to the virtual object further comprises maintaining the vertical and lateral dimensions of the viewing pane while displaying the augmented content in the second viewing direction.

Example 10 includes the elements of any one of Examples 1-9, wherein the instructions further configure the apparatus to: continuously monitor movements of the head of the user within the range of detectable vertical rotations; and dynamically recalculate the virtual object orientation-adjustment value based on the continuously monitored movements of the head of the user.

Example 11 includes the elements of any one of Examples 1-10, wherein the instructions further configure the apparatus to: continuously maintain the vertical and lateral dimensions of the viewing pane while displaying the augmented content in further viewing directions.

Machine Architecture

Figure 12:
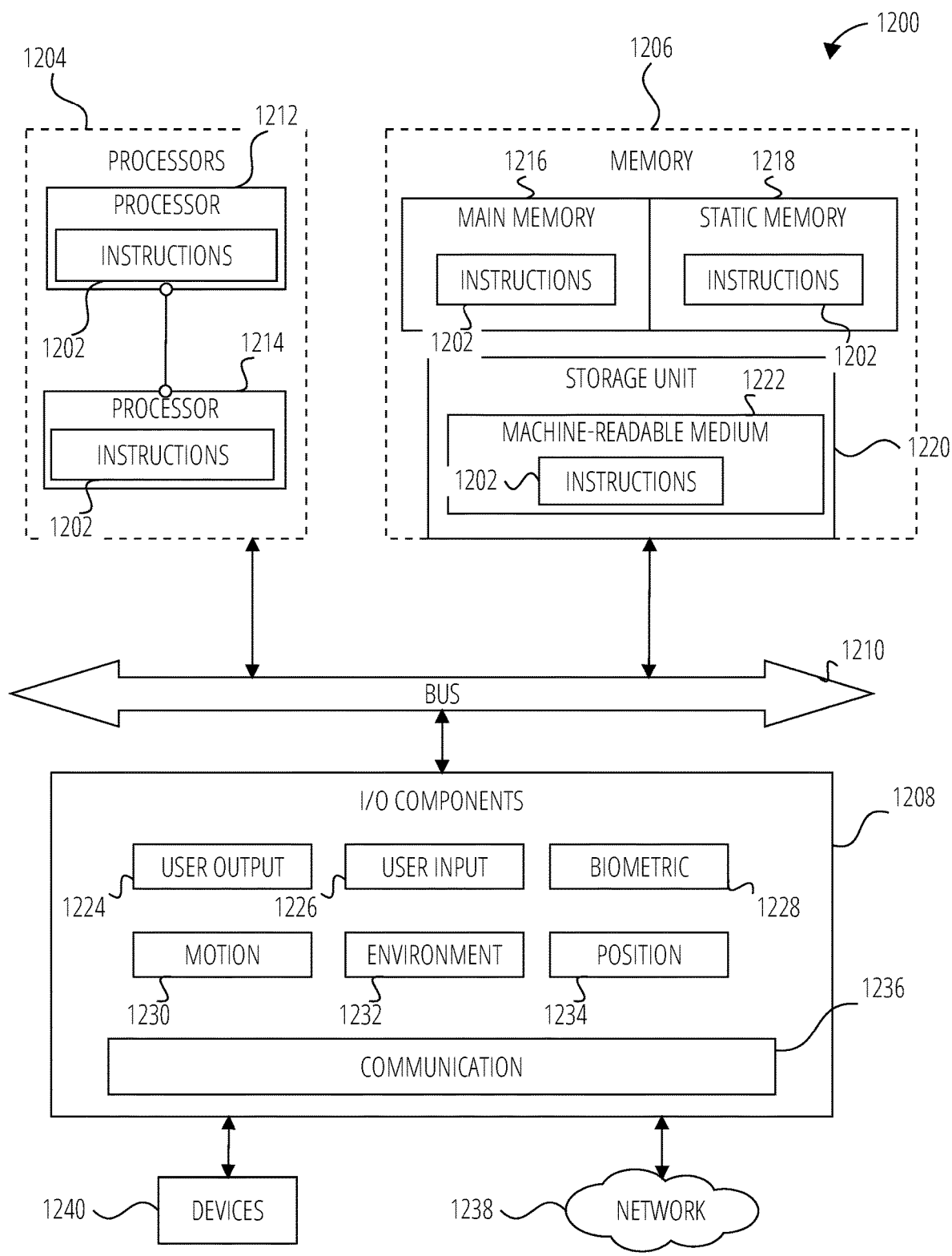
FIG. 12 is a diagrammatic representation of a machine in the form of a computer system within which a set of instructions may be executed to cause the machine to perform any one or more of the methodologies discussed herein, according to some examples.

FIG. 12 is a diagrammatic representation of the machine 1200 within which instructions 1202 (e.g., software, a program, an application, an applet, an app, or other executable code) for causing the machine 1200 to perform any one or more of the methodologies discussed herein may be executed. For example, the instructions 1202 may cause the machine 1200 to execute any one or more of the methods described herein. The instructions 1202 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while a single machine 1200 is illustrated, the term "machine" shall also be taken to include a collection of machines that individually or jointly execute the instructions 1202 to perform any one or more of the methodologies discussed herein. The machine 1200, for example, may comprise the user system 102 or any one of multiple server devices forming part of the interaction server system 110. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output (I/O) components 1208, which may be configured to communicate with each other via a bus 1210. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that execute the instructions 1202. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1216, a static memory 1218, and a storage unit 1220, both accessible to the processors 1204 via the bus 1210. The main memory 1206, the static memory 1218, and storage unit 1220 store the instructions 1202 embodying any one or more of the methodologies or functions described herein. The instructions 1202 may also reside, completely or partially, within the main memory 1216, within the static memory 1218, within machine-readable medium 1222, within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones may include a touch input device or other such input mechanisms, while a headless server machine will likely not include such a touch input device. It will be appreciated that the I/O components 1208 may include many other components that are not shown in FIG. 12. In various examples, the I/O components 1208 may include user output components 1224 and user input components 1226. The user output components 1224 may include visual components (e.g., a display such as a PDP, a LED display, a LCD, a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1208 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 further include communication components 1236 operable to couple the machine 1200 to a network 1238 or devices 1240 via respective coupling or connections. For example, the communication components 1236 may include a network interface component or another suitable device to interface with the network 1238. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1216, static memory 1218, and memory of the processors 1204) and storage unit 1220 may store one or more sets of instructions and data structures (e.g., software) embodying or used by any one or more of the methodologies or functions described herein. These instructions (e.g., the instructions 1202), when executed by processors 1204, cause various operations to implement the disclosed examples.

The instructions 1202 may be transmitted or received over the network 1238, using a transmission medium, via a network interface device (e.g., a network interface component included in the communication components 1236) and using any one of several well-known transfer protocols (e.g., HTTP). Similarly, the instructions 1202 may be transmitted or received using a transmission medium via a coupling (e.g., a peer-to-peer coupling) to the devices 1240.

Software Architecture

Figure 13:
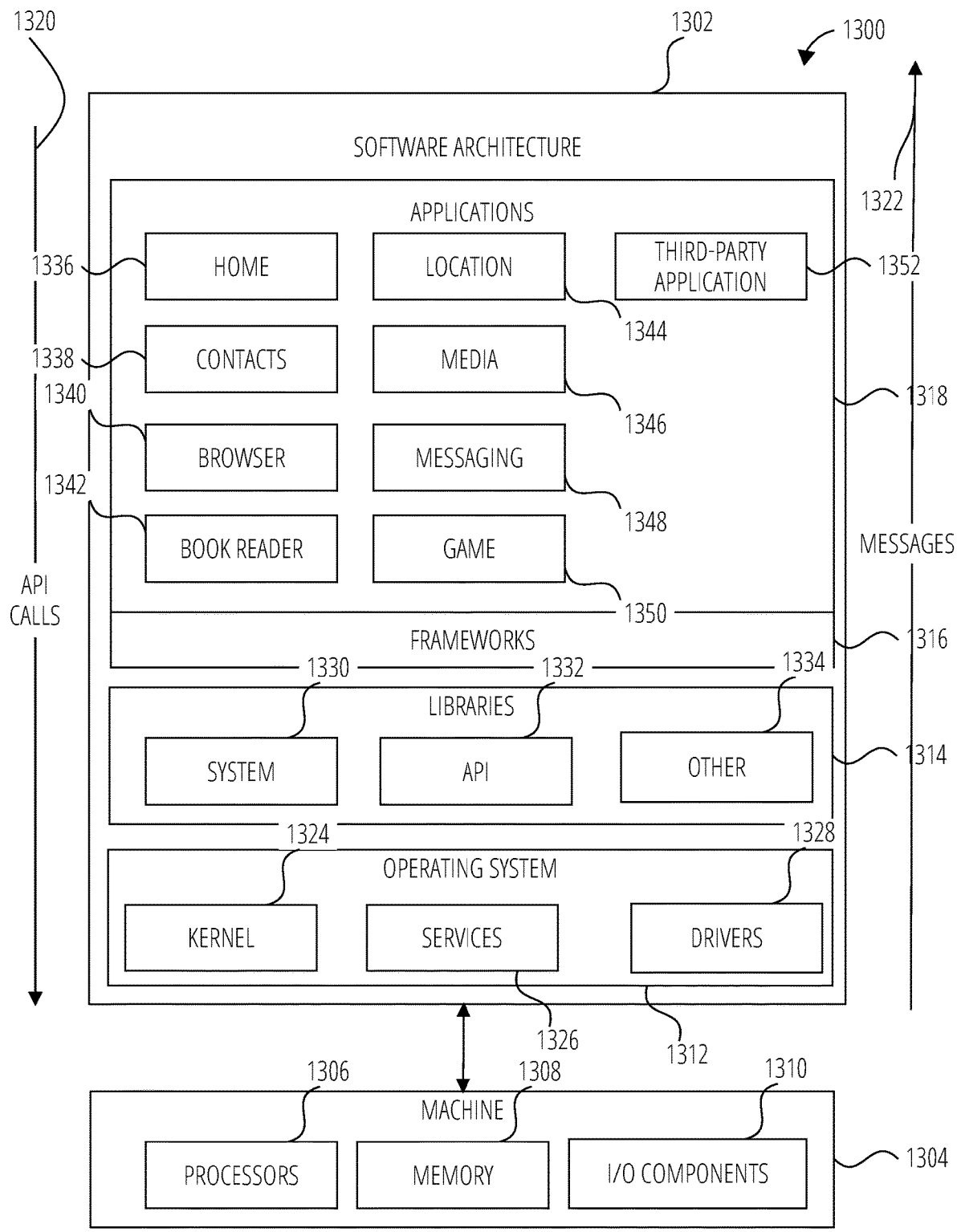
FIG. 13 is a block diagram showing a software architecture within which examples may be implemented.

FIG. 13 is a block diagram 1300 illustrating a software architecture 1302, which can be installed on any one or more of the devices described herein. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such as an operating system 1312, libraries 1314, frameworks 1316, and applications 1318. Operationally, the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 provides memory management, processor management (e.g., scheduling), component management, networking, and security settings, among other functionalities. The services 1326 can provide other common services for the other software layers. The drivers 1328 are responsible for controlling or interfacing with the underlying hardware. For instance, the drivers 1328 can include display drivers, camera drivers, BLUETOOTH® or BLU- ETOOTH® Low Energy drivers, flash memory drivers, serial communication drivers (e.g., USB drivers), WI-FI® drivers, audio drivers, power management drivers, and so forth.

The libraries 1314 provide a common low-level infrastructure used by the applications 1318. The libraries 1314 can include system libraries 1330 (e.g., C standard library) that provide functions such as memory allocation functions, string manipulation functions, mathematic functions, and the like. In addition, the libraries 1314 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1314 can also include a wide variety of other libraries 1334 to provide many other APIs to the applications 1318.

The frameworks 1316 provide a common high-level infrastructure that is used by the applications 1318. For example, the frameworks 1316 provide various GUI functions, high-level resource management, and high-level location services. The frameworks 1316 can provide a broad spectrum of other APIs that can be used by the applications 1318, some of which may be specific to a particular operating system or platform.

In an example, the applications 1318 may include a home application 1336, a contacts application 1338, a browser application 1340, a book reader application 1342, a location application 1344, a media application 1346, a messaging application 1348, a game application 1350, and a broad assortment of other applications such as third-party applications 1352. The applications 1318 are programs that execute functions defined in the programs. Various programming languages can be employed to create one or more of the applications 1318, structured in a variety of manners, such as object-oriented programming languages (e.g., Objective-C, Java, or C++) or procedural programming languages (e.g., C or assembly language). In a specific example, the third-party application 1352 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1352 can invoke the API calls 1320 provided by the operating system 1312 to facilitate functionalities described herein.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multi-processor systems, microprocessor-based or programmable consumer electronics, game console, STB, or any other communication device that a user may use to access a network.

"Communication network" refers, for example, to one or more portions of a network that may be an ad hoc network, an intranet, an extranet, a virtual private network (VPN), a local area network (LAN), a WLAN, a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or ASIC. A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

Some examples described herein include reference to terms such as "horizontal" and "vertical" and so forth. In some examples, these terms include within their ambit "substantially" horizontal and/or vertical where appropriate, and not strictly "bolt upright" or "level," for example. Some examples include within their ambit horizontal or vertical, plus or minus 5, 10, or 15 degrees, from horizontal or vertical, respectively. Some examples include within their ambit horizontal or vertical, plus or minus a range of 5-45 degrees from horizontal or vertical, respectively.

"Computer-readable storage medium" refers, for example, to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers, for example, to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A method of orienting content in an augmented reality display in a head-wearable apparatus, the method comprising:
   determining an imaginary reference plane intersecting a head of a user when wearing the head-wearable apparatus to view a virtual object of augmented content visible in a viewing pane having vertical and lateral dimensions when viewed in a display of the head-wearable apparatus, the imaginary reference plane coinciding with a first viewing direction of the head of the user;
   determining or defining a range of detectable vertical rotations of the head of the user;
   detecting, within the range of detectable vertical rotations, a rotational movement of the head of the user in a vertical direction while viewing the augmented content;
   in response to the detected rotational movement, determining a second viewing direction of the head of the user when viewing the augmented content in the second viewing direction; and
   determining a reference angle between the imaginary reference plane and the second viewing direction and, based on the reference angle, assigning one of, or a combination of, a billboard display mode and a headlock display mode to the augmented content presented in the display of the head-wearable apparatus when viewed in the second viewing direction.

2. The method of claim 1, wherein the imaginary reference plane is horizontal and coincides with a horizontal dimension of the viewing pane.

3. The method of claim 1, wherein the detected rotational movement of the head of the user is detected using the head-wearable apparatus.

4. The method of claim 1, wherein the assigning of the one of, or the combination of, the billboard display mode and the headlock display mode to the augmented content is further based on a determined ratio of the billboard display mode relative to the headlock display mode within the range of detectable vertical rotations of the head of the user.

5. The method of claim 4, wherein the determined ratio is directly proportional to the reference angle.

6. The method of claim 4, wherein the determined ratio is algorithmically determined based on the reference angle.

7. The method of claim 6, wherein the algorithmic determination includes:
   determining a first rotational angle of elevation or declination of an axis normal to the viewing pane with respect to the head of the user; and
   determining a second rotational angle of elevation or declination of the axis normal to the viewing pane to render the viewing pane substantially orthogonal to the second viewing direction.

8. The method of claim 7, wherein the algorithmic determination further includes:
   combining the first rotational angle and the second rotational angle into a virtual object orientation-adjustment value; and
   applying the virtual object orientation-adjustment value to the virtual object while displaying the augmented content in the second viewing direction.

9. The method of claim 8, wherein applying the virtual object orientation-adjustment value to the virtual object further comprises maintaining the vertical and lateral dimensions of the viewing pane while displaying the augmented content in the second viewing direction.

10. The method of claim 9, further comprising:
    continuously monitoring movements of the head of the user within the range of detectable vertical rotations; and
    dynamically recalculating the virtual object orientation-adjustment value based on the continuously monitored movements of the head of the user.

11. The method of claim 9, further comprising:
    continuously maintaining the vertical and lateral dimensions of the viewing pane while displaying the augmented content in further viewing directions.

12. A head-wearable apparatus comprising:
    a processor; and
    a memory storing instructions that, when executed by the processor, configure the head-wearable apparatus to:
    determine an imaginary reference plane intersecting a head of a user when wearing the head-wearable apparatus to view a virtual object of augmented content visible in a viewing pane having vertical and lateral dimensions when viewed in a display of the head-wearable apparatus, the imaginary reference plane coinciding with a first viewing direction of the head of the user;
    determine or define a range of detectable vertical rotations of the head of the user;
    detect, within the range of detectable vertical rotations, a rotational movement of the head of the user in a vertical direction while viewing the augmented content;
    in response to the detected rotational movement, determine a second viewing direction of the head of the user when viewing the augmented content in the second viewing direction; and
    determine a reference angle between the imaginary reference plane and the second viewing direction and, based on the reference angle, assign one of, or a combination of, a billboard display mode and a headlock display mode to the augmented content presented in the display of the head-wearable apparatus when viewed in the second viewing direction.

13. The head-wearable apparatus of claim 12, wherein the imaginary reference plane is horizontal and coincides with a horizontal dimension of the viewing pane.

14. The head-wearable apparatus of claim 12, wherein the detected rotational movement of the head of the user is detected using the head-wearable apparatus.

15. The head-wearable apparatus of claim 12, wherein the assigning of the one of, or the combination of, the billboard display mode and the headlock display mode to the augmented content is further based on a determined ratio of the billboard display mode relative to the headlock display mode within the range of detectable vertical rotations of the head of the user.

16. The head-wearable apparatus of claim 15, wherein the determined ratio is directly proportional to the reference angle.

17. The head-wearable apparatus of claim 15, wherein the determined ratio is algorithmically determined based on the reference angle.

18. The head-wearable apparatus of claim 17, wherein the algorithmic determination includes:
 determining a first rotational angle of elevation or declination of an axis normal to the viewing pane with respect to the head of the user; and
 determining a second rotational angle of elevation or declination of the axis normal to the viewing pane to render the viewing pane substantially orthogonal to the second viewing direction.

19. The head-wearable apparatus of claim 18, wherein the algorithmic determination further includes:
 combining the first rotational angle and the second rotational angle into a virtual object orientation-adjustment value; and
 applying the virtual object orientation-adjustment value to the virtual object while displaying the augmented content in the second viewing direction.

20. The head-wearable apparatus of claim 19, wherein applying the virtual object orientation-adjustment value to the virtual object further comprises maintaining the vertical and lateral dimensions of the viewing pane while displaying the augmented content in the second viewing direction.

21. The head-wearable apparatus of claim 20, wherein the instructions further configure the head-wearable apparatus to:
 continuously monitor movements of the head of the user within the range of detectable vertical rotations; and
 dynamically recalculate the virtual object orientation-adjustment value based on the continuously monitored movements of the head of the user.

22. The head-wearable computing apparatus of claim 20, wherein the instructions further configure the head-wearable apparatus to:
 continuously maintain the vertical and lateral dimensions of the viewing pane while displaying the augmented content in further viewing directions.

23. A non-transitory computer-readable storage medium, the non-transitory computer-readable storage medium including instructions that when executed by a computer, cause the computer to:
 determine an imaginary reference plane intersecting a head of a user when wearing a head-wearable apparatus to view a virtual object of augmented content visible in a viewing pane having vertical and lateral dimensions when viewed in a display of the head-wearable apparatus, the imaginary reference plane coinciding with a first viewing direction of the head of the user;
 determine or define a range of detectable vertical rotations of the head of the user;
 detect, within the range of detectable vertical rotations, a rotational movement of the head of the user in a vertical direction while viewing the augmented content;
 in response to the detected rotational movement, determine a second viewing direction of the head of the user when viewing the augmented content in the second viewing direction; and
 determine a reference angle between the imaginary reference plane and the second viewing direction and, based on the reference angle, assign one of, or a combination of, a billboard display mode and a headlock display mode to the augmented content presented in the display of the head-wearable apparatus when viewed in the second viewing direction.

24. The non-transitory computer-readable storage medium of claim 23, wherein the imaginary reference plane is horizontal and coincides with a horizontal dimension of the viewing pane.

25. The non-transitory computer-readable storage medium of claim 23, wherein the detected rotational movement of the head of the user is detected using the head-wearable apparatus.

26. The non-transitory computer-readable storage medium of claim 23, wherein the assigning of the one of, or the combination of, the billboard display mode and the headlock display mode to the augmented content is further based on a determined ratio of the billboard display mode relative to the headlock display mode within the range of detectable vertical rotations of the head of the user.

27. The non-transitory computer-readable storage medium of claim 26, wherein the determined ratio is directly proportional to the reference angle.

28. The non-transitory computer-readable storage medium of claim 26, wherein the determined ratio is algorithmically determined based on the reference angle.

29. The non-transitory computer-readable storage medium of claim 28, wherein the algorithmic determination includes:
 determining a first rotational angle of elevation or declination of an axis normal to the viewing pane with respect to the head of the user; and
 determining a second rotational angle of elevation or declination of the axis normal to the viewing pane to render the viewing pane substantially orthogonal to the second viewing direction.

30. The non-transitory computer-readable storage medium of claim 29, wherein the algorithmic determination further includes:
 combining the first rotational angle and the second rotational angle into a virtual object orientation-adjustment value; and
 applying the virtual object orientation-adjustment value to the virtual object while displaying the augmented content in the second viewing direction.

31. The non-transitory computer-readable storage medium of claim 30, wherein applying the virtual object orientation-adjustment value to the virtual object further comprises maintaining the vertical and lateral dimensions of the viewing pane while displaying the augmented content in the second viewing direction.

32. The non-transitory computer-readable storage medium of claim 31, wherein the instructions further configure the computer to:
 continuously monitor movements of the head of the user within the range of detectable vertical rotations; and
 dynamically recalculate the virtual object orientation-adjustment value based on the continuously monitored movements of the head of the user.

33. The non-transitory computer-readable storage medium of claim 31, wherein the instructions further configure the computer to:
 continuously maintain the vertical and lateral dimensions of the viewing pane while displaying the augmented content in further viewing directions.

* * * * *